United States Patent [19]

Ny

[11] Patent Number: 4,543,562
[45] Date of Patent: Sep. 24, 1985

[54] MECHANICALLY-ACTUATED TOUCHBARS AND TOUCHPLATES USING MULTIPLE-CLOSURE SWITCHES

[75] Inventor: Nils O. Ny, Levittown, Pa.

[73] Assignee: RCA Corporation, Princeton, N.J.

[21] Appl. No.: 410,547

[22] Filed: Aug. 23, 1982

[51] Int. Cl.³ ............................................. G08C 9/00
[52] U.S. Cl. .................. 340/365 S; 200/5 A; 340/365 R; 400/100
[58] Field of Search ............ 200/5 A, DIG. 1; 340/365 R, 365 S, 365 A, 365 D; 400/87, 88, 100, 101, 102, 472, 486, 489, 121, 94; 179/90 K

[56] References Cited

U.S. PATENT DOCUMENTS

| | | | |
|---|---|---|---|
| 3,225,883 | 12/1965 | Ayres | 400/100 |
| 3,312,892 | 4/1967 | Parnes | 323/93 |
| 3,702,957 | 11/1972 | Wolfendale | 317/246 |
| 4,103,252 | 7/1978 | Bobick | 331/48 |
| 4,118,611 | 10/1978 | Harris | 200/674 |
| 4,177,421 | 12/1979 | Thornburg | 324/61 R |

FOREIGN PATENT DOCUMENTS

| | | |
|---|---|---|
| 0033910 | 8/1981 | European Pat. Off. |
| 1552753 | 9/1979 | United Kingdom |
| 2048531 | 12/1980 | United Kingdom |

Primary Examiner—John W. Caldwell, Sr.
Assistant Examiner—Michael F. Heim
Attorney, Agent, or Firm—Joseph S. Tripoli; George E. Haas; Allen LeRoy Limberg

[57] ABSTRACT

A touchbar or touchplate is supported on its edges by force-sensitive switches, such as push-button switches, each having a plurality of contacts opened or closed at different pressure thresholds. The pattern of which contact conditions of conduction or non-conduction is converted to logic ONES's and ZERO's and decoded to obtain indications to which a plurality of touchpoint regions on the touchbar or touchplate a user applies force.

21 Claims, 16 Drawing Figures

TABLE III

| REGION BEING TOUCHED | SWITCH 11 α CONTACTS | SWITCH 11 β CONTACTS | SWITCH 12 α CONTACTS | SWITCH 12 β CONTACTS | SWITCH 13 α CONTACTS | SWITCH 13 β CONTACTS | SWITCH 14 α CONTACTS | SWITCH 14 β CONTACTS |
|---|---|---|---|---|---|---|---|---|
| a | — — | o — | o o | o o | o o | o o | o o | o o |
| b | — | — | o | o | o | o | — | o |
| c | — — | o — | o o | o o | o o | o o | — — | o — |
| d | — | o | o | o | o | o | — | — |
| e | o o | o o | o o | o o | o o | o o | — — | o — |
| f | — | — | — | o | o | o | o | o |
| g | — | — | — | o | o | o | — | o |
| h | — | o | — | o | — | o | — | o |
| i | — | o | o | o | — | o | — | — |
| j | — | o | o | o | — | o | — | — |
| k | — — | o — | — — | o — | o o | o o | o o | o o |

Fig. 4a

TABLE III CONT.

| REGION BEING TOUCHED | SWITCH 11 | | SWITCH 12 | | SWITCH 13 | | SWITCH 14 | |
|---|---|---|---|---|---|---|---|---|
| | α CONTACTS | β CONTACTS | α CONTACTS | β CONTACTS | α CONTACTS | β CONTACTS | α CONTACTS | β CONTACTS |
| l | — | — | — | — | — | — | — | o |
| m | — — | o — | — — | o — | — — | o — | — — | o — |
| n | — | o | — | o | — | — | — | o |
| o | o o | o o | o o | o o | o | o — | o | o — |
| p | — | o | — | — | o | o | o | o |
| q | — | o | — | — | — | o | o | o |
| r | o | o | — | o | — | — | — | — |
| s | o | o | o | o | — | — | — | o |
| t | o | o | — | o | — | — | — | o |
| u | o o | o o | — — | o — | o o | o o | o o | o o |
| v | o | o | — | — | — | o | o | o |

TABLE III CONT.

| REGION BEING TOUCHED | SWITCH 11 | | SWITCH 12 | | SWITCH 13 | | SWITCH 14 | |
|---|---|---|---|---|---|---|---|---|
| | α CONTACTS | β CONTACTS | α CONTACTS | β CONTACTS | α CONTACTS | β CONTACTS | α CONTACTS | β CONTACTS |
| w | 0 0 | 0 0 | 1 1 | 0 1 | 1 1 | 0 1 | 0 0 | 0 0 |
| x | 0 | 0 | 1 | 0 | 1 | 1 | 0 | 0 |
| y | 0 0 | 0 0 | 0 0 | 0 0 | 1 1 | 0 1 | 0 0 | 0 0 |

Fig. 5

MECHANICALLY-ACTUATED TOUCHBARS AND TOUCHPLATES USING MULTIPLE-CLOSURE SWITCHES

The present invention relates to mechanically actuated touchbar or touchplate apparatus in which the touchplate or touchbar may be transparent.

Such apparatus is useful, by way of illustration, in electronic game apparatus where a viewscreen is to be viewed through a transparent touchplate. Similar apparatus is useful with a computer video terminal to facilitate operator selection from a menu posted on a cathode ray tube behind a transparent touchplate.

C. M. Wine in a concurrently filed patent application, Ser. No. 410,485, entitled "Mechanically-Actuated Transparent Touchbars and Touchplates" describes a transparent touchbar supported at its ends by force-sensitive (e.g., "pushbutton") switches and provided with logic for three valid touchpoint areas along its length. He also describes a transparent rectangular touchplate supported at its corners by force-sensitive switches and provided with logic for discerning among nine valid touchpoint areas arranged in a three-column-by-three-row array on the surface of the touchplate. The force-sensitive switches may be simple single-pole, single-throw switches of either normally open or normally closed type. These types of switches will be called "single-closure" switches in this specification.

The present invention is a modification of the Wine apparatus in which each of the force-sensitive single-closure switches in the Wine apparatus is replaced by a force-sensitive switch having two single-pole, single-throw component switches in it respectively actuated by relatively small and relatively large forces on the same push-button or other actuating member. A switch with plural, normally-open contacts sequentially closed as force applied to the actuating member is increased or a switch with plural, normally-closed contacts sequentially opened as force applied to the actuating member is increased will be considered to be a "plural-closure" switch in this specification. A representative type of double-closure switch with normally open contacts is the KHF 10904 switch in the KHF series of keyboard switches manufactured by ALPS Electric Co., Ltd., of Tokyo, Japan, and distributed in the United States by ALPS Electric (USA), Inc., having its head office at 100 North Centre Avenue, Rockville Centre, NY 11570. The first set of switch contacts is closed responsive to applied force of 90±40 g., and the second set is closed responsive to applied force of 280±100 g. in the KHF 10904 switch. A touchbar modified to have a pair of double-closure switches as end supports has as many as five, rather than only three, valid touchpoint areas; and a rectangular touchplate modified to have four such switches as corner supports has as many as twenty-five, rather than only nine, valid touchpoint areas. Using multiple-closure, rather than double-closure, force-sensitive switches allows the design of touchbars and touchplates with still greater numbers of valid touchpoint areas.

The present invention is embodied in touch-responsive apparatus comprising a structural member to selected areas of which an actuating force may be applied supported at a plurality of points by switches, at least one of which is a plural-closure switch, and a decoder responding to the switch contacts closure pattern for determining to which of the selected areas an actuating force is applied.

In the drawing:

FIG. 1 is an exploded view of a touchplate assembly constructed in accordance with the invention, with FIG. 1A providing an electrical schematic of the plural-closure switches used in the FIG. 1 assembly;

FIGS. 2 a-i diagram force conditions on a touchbar or on a touchplate assembly in accordance with the invention, which is shown in profile and is supported by force-discriminating double-closure force-sensitive switches;

Figures 1, 1A:
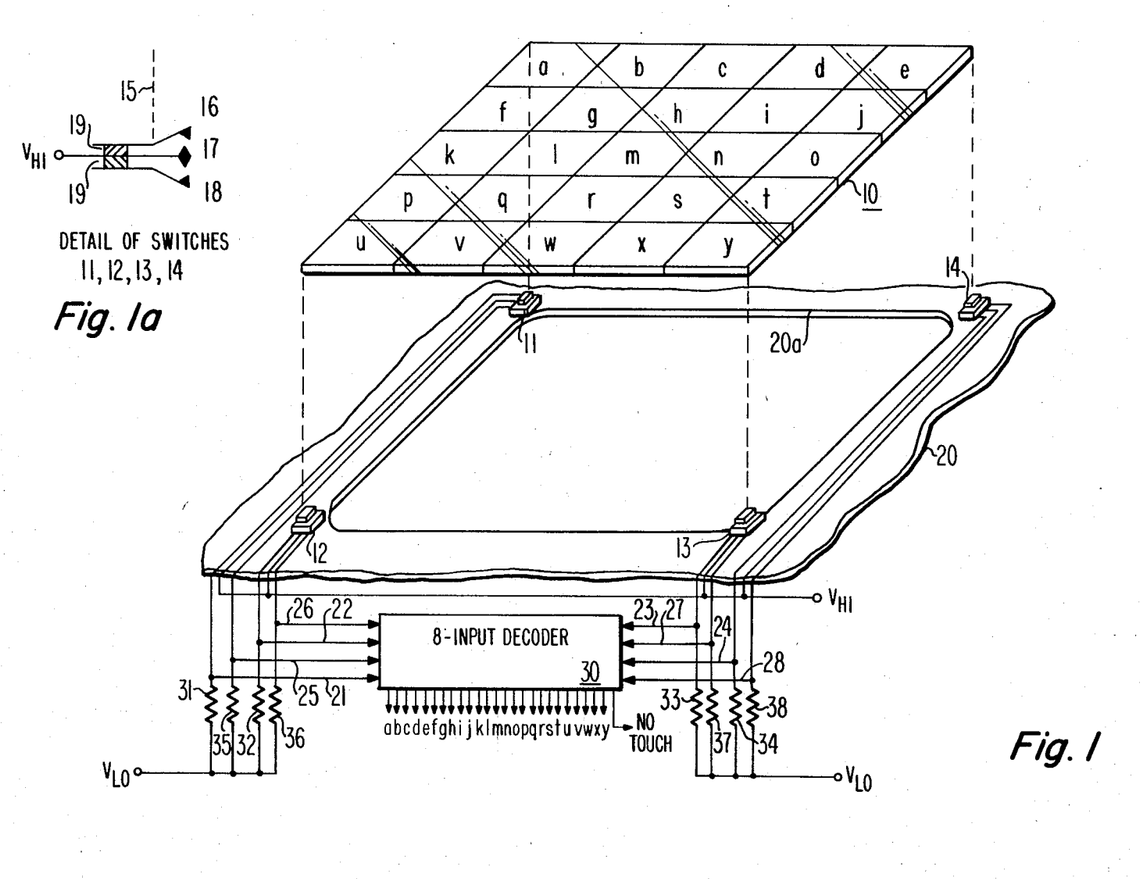

The FIG. 1 view of a touchplate assembly is exploded by lifting the transparent touchplate 10 from its corner supports as provided by force-sensitive switches 11, 12, 13 and 14. Each of these force-sensitive switches has two sets of normally open contacts. The first set is closed responsive to a relatively small applied force, and the second set is closed responsive to a relatively large applied force. These sets of contacts may share a common contact. FIG. 1A is an electrical schematic which suggests a representative structure for switches 11, 12, 13, 14 comprising three phosphor bronze contact leaves 16, 17, 18 interspaced by insulating blocks 19 at their left ends. Light pressure on the push-button, or actuating member, 15 transmits a small force through it that bends leaf 16 and closes the contacts of that leaf and of leaf 17 through which common connection is made. Heavy pressure on the push-button bends leaf 16 further and is transmitted through the further bending of leaf 16 to bend leaf 17 sufficiently to also close the contacts of leaf 17 and of leaf 18. The double-closure switches 11, 12, 13, 14 are conveniently selected to be printed circuit switches, allowing their mounting on a printed circuit board support member 20.

Support member 20 is shown as having a rectangular aperture 20A with corners close to the positions of switches 11, 12, 13, 14 to allow viewing of a screen through transparent touchplate 10 and aperture 20A. This screen (not shown in FIG. 1) is located below the hole in support member 20. Alternatively support member 20 could be replaced by one of transparent material without a void below touchplate 10; such a transparent support member could be provided an anti-reflective coating. Where the touchplate need not be viewed through, it can be opaque and an opaque support member without aperture can be used.

Touchplate 10 is shown divided into a five-column-by-five-row array of touchpoint locations labeled with respective ones of the letters of the English alphabet excluding z. An eight-input decoder 30 responds to the busses 21, 22, 23, 24, 25, 26, 27 and 28 being selectively clamped to the voltage $V_{HI}$, which voltage can be associated with a logic ONE, by the closure of contacts in switches 11, 12, 13 and 14. Such closure would be in response to user-applied pressure on one of the touchpoints a-y of touchplate 10. Decoder 30 supplies an indication of which touchpoint force was applied to, this indication being supplied on one of twenty-five output lines assuming decoder 30 output to be in non-coded form. When busses 21, 22, 23, 24, 25, 26, 27 and 28 are not clamped to $V_{HI}$ by closure of contacts of switches 11, 12, 13 or 14, these busses are biased to voltage $V_{LO}$, the voltage associated with logic ZERO, via resistances 31, 32, 33, 34, 35, 36, 37 and 38, respectively.

The selective clamping process can be considered, more particularly, switch by switch. When the first set of contacts close in switch 11 responsive to relatively light force on its push-button, bus 21 is clamped to the relatively high voltage $V_{HI}$ associated with a logic ONE and applied in common to the sets of contacts in switch 11. When the first set of contacts close in switch 12 responsive to relatively small force on its push-button, bus 22 is clamped to the relatively high voltage $V_{HI}$ associated with a logic ONE and applied in common to the sets of contacts in switch 12. When the first set of contacts close in switch 13 responsive to relatively small force on its push-button, bus 23 is clamped to the relatively high voltage $V_{HI}$ associated with a logic ONE and applied in common to the sets of contacts in switch 13. When the first set of contacts close in switch 14 responsive to relatively small force on its push-button, bus 24 is clamped to the relatively high voltage $V_{HI}$ associated with a logic ONE and applied in common to the sets of contacts in switch 14. When both sets of contacts in switch 11 close responsive to relatively large force on its push-button, both busses 21 and 25 are clamped to $V_{HI}$. When both sets of contacts in switch 12 close responsive to relatively large force on its push-button, both busses 22 and 26 are clamped to $V_{HI}$. When both sets of contacts in switch 13 close responsive to relatively large force on its push-button, both busses 23 and 27 are clamped to $V_{HI}$. When both sets of contacts in switch 14 close responsive to relatively large force on its push-button, both busses 24 and 28 are clamped to $V_{HI}$.

The patterns of closure of switches 11, 12, 13, 14 associated with pressure being applied to different ones of the touchpoints a-y on touchplate 10 will now be considered. This two-dimensional problem in resolving applied force into components at the support points is separable, and thus can be considered in terms of two orthogonal single-dimensional problems in resolving point of application, the first dimension being in the direction of rows in the rectangular array of touchpoints a-y and the second dimension in the direction of the columns in that array. This, in effect, reduces the problem of the rectangular touchplate supported at its corners to that of the linear touchbar supported at its ends.

Figure 2:
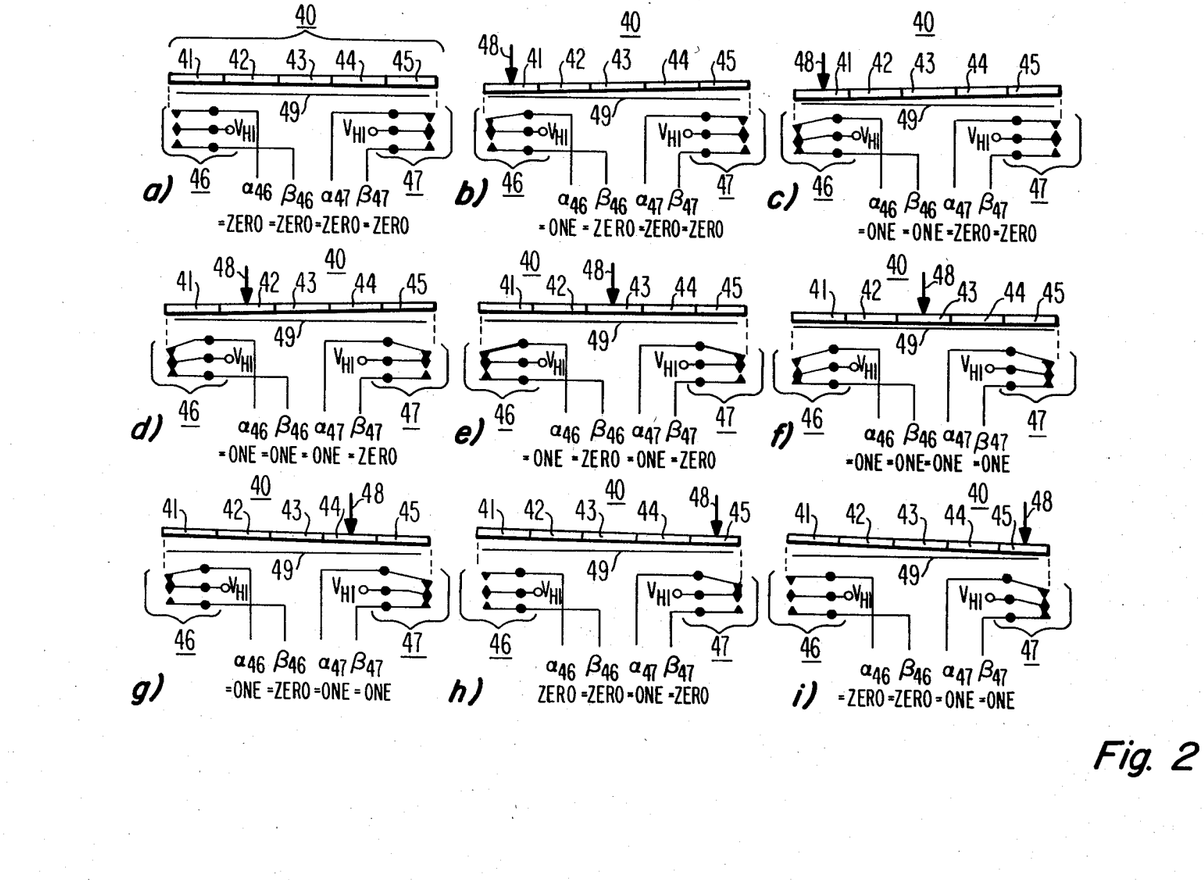

FIGS. 2 a-i, show the various switch closure conditions that can obtain for a touchbar 40 divided from left to right along its length into five touchpoint regions 41, 42, 43, 44 and 45 and supported at its ends by double-closure switches 46 and 47. These various conditions result responsive to user-applied force (represented by vector 48) being applied on different ones of the regions 41-45. The analysis of which switch contacts close can be calculated according to the laws of classical mechanics, as applied to a beam supported at each of its ends. After translation of the beam responsive to user-applied force 48 is completed, the applied force 48 (which may include a component ascribable to the touchbar or touchplate weight) is equal to the sum of the countervailing forces applied to the beam by the switches 46, 47 and thus to the forces applied to the switches by the beam. After rotation of the beam responsive to user-applied force is completed, clockwise first moments must equal counterclockwise first moments. The equations describing this equality about the point of application of force are then written and cross-solved with the previous equalities to resolve the respective components of user-applied force on switches 46 and 47. The component of user-applied force on each of the switches is then compared to the force thresholds where one of its sets of contacts close and where both of its sets of contacts close to determine the conditions of each of the double-closure switches.

In the various portions of FIG. 2, touchbar 40 or its like is presumed to be made of transparent material, permitting the viewing of a viewscreen 49, shown in profile, there under. FIG. 2(a) diagrams the switch closure condition when there is no force applied by the user to any of the touchpoints.

In FIG. 2b relatively light foce applied to the left end region 41 closes one set of contacts in switch 46, and in FIG. 2c relatively strong force closes both sets of contacts in switch 47.

The contacts of switch 47 remain open in either case.

Force applied to the middle region will be resolved about equally between the actuating members of switches 46 and 47. Each switch will have one of its sets of contacts closed, if applied force is relatively light as in FIG. 2e; or each will have both its sets of contacts closed if applied force is relatively strong as in FIG. 2f.

Light force applied to the right-hand region 43 in FIG. 2h closes one of contacts in switch 47; and strong force applied to region 43 in FIG. 2i closes both sets. The contacts of switch 46 remain open in either case.

FIG. 2d shows the condition where force is applied to region 42 between left end region 41 and middle region 43. The force is resolved into component forces on the actuating member of switches 46 and 47 that are relatively large and relatively small, respectively. Both sets of contacts in switch 46 close, but only a single set in switch 47.

FIG. 2g shows the condition where force is applied to region 44 between middle region 43 and right end region 45. The force is resolved into component forces on the actuating members of switches 46 and 47 that are relatively small and relatively large, respectively. Both sets of contacts in switch 46 close, but only a single set in switch 47.

FIGS. 2(a-i) can be distilled into the following truth table. Each force-sensitive switch is considered to have a set of contacts, $\alpha$, closed only for actuating forces greater than a relatively low threshold value and a set of contacts, $\beta$, closed only for actuating forces greater than a relatively high threshold value. Closure of contacts is signified by a logic ONE; and their opening, by a logic ZERO.

TABLE I

| REGION BEING TOUCHED | LEFT SWITCH 46 | | RIGHT SWITCH 47 | |
|---|---|---|---|---|
| | $\beta$ CONTACTS | $\alpha$ CONTACTS | $\beta$ CONTACTS | $\alpha$ CONTACTS |
| none | 0 | 0 | 0 | 0 |
| 45 | 0 | 0 | 0 | 1 |
| impossible | 0 | 0 | 1 | 0 |
| 45 | 0 | 0 | 1 | 1 |
| 41 | 0 | 1 | 0 | 0 |
| 43 | 0 | 1 | 0 | 1 |
| impossible | 0 | 1 | 1 | 0 |
| 44 | 0 | 1 | 1 | 1 |
| impossible | 1 | 0 | 0 | 0 |
| impossible | 1 | 0 | 0 | 1 |

TABLE I-continued

| REGION BEING TOUCHED | LEFT SWITCH 46 | | RIGHT SWITCH 47 | |
|---|---|---|---|---|
| | β CONTACTS | α CONTACTS | β CONTACTS | α CONTACTS |
| impossible | 1 | 0 | 1 | 0 |
| impossible | 1 | 0 | 1 | 1 |
| 41 | 1 | 1 | 0 | 0 |
| 42 | 1 | 1 | 0 | 1 |
| impossible | 1 | 1 | 1 | 0 |
| 43 | 1 | 1 | 1 | 1 |

The impossible conditions in the table arise from letting the set of four-bit binary numbers describing contact conditions run consecutively to make sure no contact condition is omitted, while in actuality one cannot exert force on a double-closure switch above the threshold required to close its β contacts without closing its α contacts, which close at lower threshold. Table I maybe re-arranged to the more-convenient-to-use Table II following, with impossible conditions being omitted.

TABLE II

Figure 3:
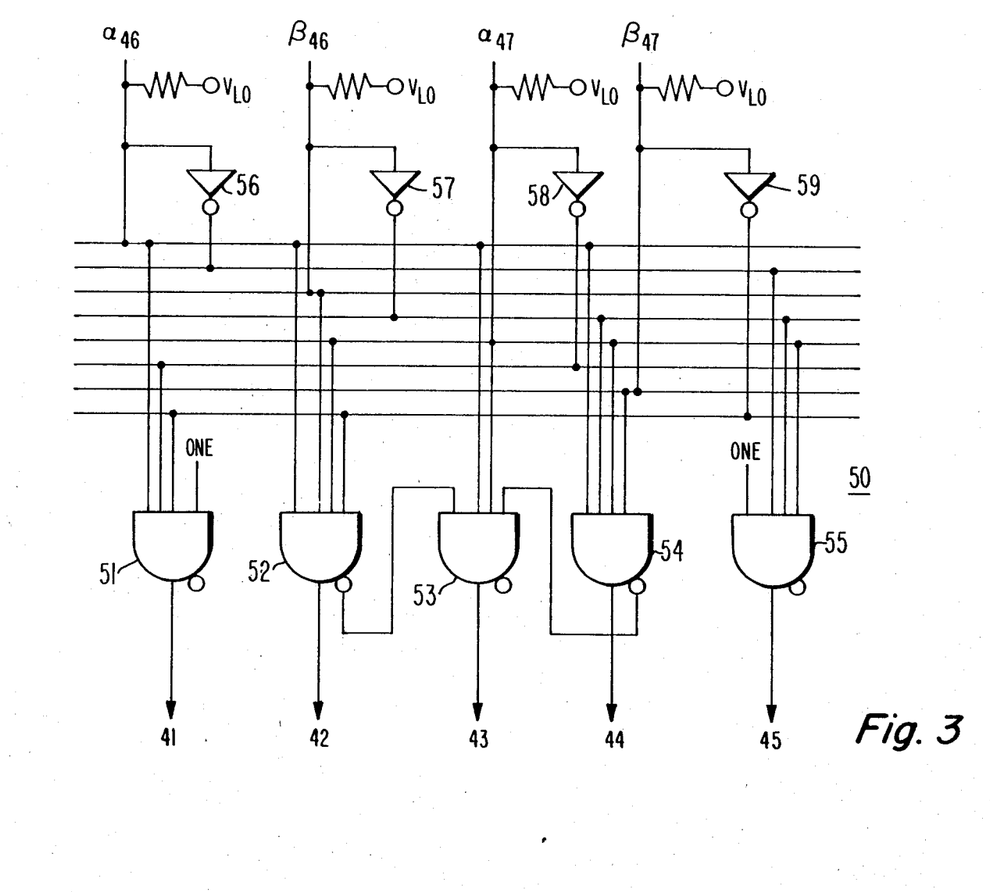
FIG. 3 is a schematic diagram of a typical four-input decoder arrangement for use with a touchbar per FIG. 2.

| REGION BEING TOUCHED | LEFT SWITCH 46 | | RIGHT SWITCH 47 | |
|---|---|---|---|---|
| | α CONTACTS | β CONTACTS | α CONTACTS | β CONTACTS |
| none | 0 | 0 | 0 | 0 |
| 41 | 1 | 0 | 0 | 0 |
| | 1 | 1 | 0 | 0 |
| 42 | 1 | 1 | 1 | 0 |
| 43 | 1 | 0 | 1 | 0 |
| | 1 | 1 | 1 | 1 |
| 44 | 1 | 0 | 1 | 1 |
| 45 | 0 | 0 | 1 | 0 |
| | 0 | 0 | 1 | 1 |

Where a simple five-touchpoint touchbar 40 is all that one requires, a simple four-input decoder is readily constructed to address five lines responsive to the contact conditions described in Table II as exemplified by decoder 50 in FIG. 3. The design procedure for decoder 50 is to use an AND gate for each line of the table, inverting inputs that are to receive logic ZERO and not inverting inputs that are to receive logic ONE. The output of the AND gate is to the output line going to logic ONE whenever the specified associated touchpoint region is touched, if there be only a single line entry in the table for that region. If there are two lines in the table, the outputs of the AND gates for each entry are applied as inputs to an OR gate and its output is to the output line going to logic ONE whenever the associated touchpoint region is touched. Standard logic manipulation techniques can then be applied to the basic logic network.

More particularly, the following logic equations describe the desired operation for decoder 50, where $\alpha_{46}$ is the logic variable expressing the condition of the α contacts of the switch 46 and $\beta_{46}$ the logic variable expressing the condition of its β contacts, and where $\alpha_{47}$ and $\beta_{47}$ respectively express the conditions of the α and β contacts of switch 47.

$$41 = (\alpha_{46} \cdot \overline{\beta_{46}} \cdot \overline{\alpha_{47}} \cdot \overline{\beta_{47}}) + (\alpha_{46} \cdot \beta_{46} \cdot \overline{\alpha_{47}} \cdot \overline{\beta_{47}})$$

$$42 = \alpha_{46} \cdot \beta_{46} \cdot \alpha_{47} \cdot \overline{\beta_{47}}$$

$$43 = (\alpha_{46} \cdot \overline{\beta_{46}} \cdot \alpha_{47} \cdot \overline{\beta_{47}}) + (\alpha_{46} \cdot \beta_{46} \cdot \alpha_{47} \cdot \beta_{47})$$

$$44 = \alpha_{46} \cdot \overline{\beta_{46}} \cdot \alpha_{47} \cdot \beta_{47}$$

$$45 = (\overline{\alpha_{46}} \cdot \overline{\beta_{46}} \cdot \alpha_{47} \cdot \overline{\beta_{47}}) + (\overline{\alpha_{46}} \cdot \overline{\beta_{46}} \cdot \alpha_{47} \cdot \beta_{47})$$

The two AND gates and following OR gate used in developing each of the dependent logic variables 41 and 45 can be replaced by a single AND gate. I.e., the condition of $\beta_{46}$ is of no consequence in determining 41, and the condition of $\beta_{47}$ is of no consequence in determining 45. This leads to the simpler logic equations, following, each realizable with a single AND gate and logic inverters for the independent logic variables.

$$41 = \alpha_{46} \cdot \overline{\alpha_{47}} \cdot \overline{\beta_{47}}$$

$$45 = \overline{\alpha_{46}} \cdot \overline{\beta_{46}} \cdot \alpha_{47}$$

A similar reduction in hardware for determining 43 is desirable. If one considers an AND gate with $\alpha_{46}$ and $\alpha_{47}$ inputs, the 41 and 45 true conditions are discriminated against, but not the 42 and 44 true conditions. So an AND gate with $\alpha_{46}$, $\alpha_{47}$, $\overline{42}$ and $\overline{44}$ inputs, which operates according to the following equation is a dual-rank solution that is attractive in requiring no gates in addition to those extant for determining 41, 42, 44, 45.

$$43 = \alpha_{46} \cdot \alpha_{47} \cdot \overline{42} \cdot \overline{44}$$

FIG. 3 shows how the logic equations, as developed by the manipulations first described, can be realized with a decoder 50 comprising five four-input AND/NAND gates 51, 52, 53, 54, 55 and inverters 56, 57, 58, 59. Dependent logic variables 41, 42, 43, 44, and 45 each going to logic ONE when the correspondingly numbered touchpoint region on touchbar 40 is pressed, are supplied at the true outputs of AND/NAND gates 51, 52, 53, 54 and 55 respectively.

Figure 4A:
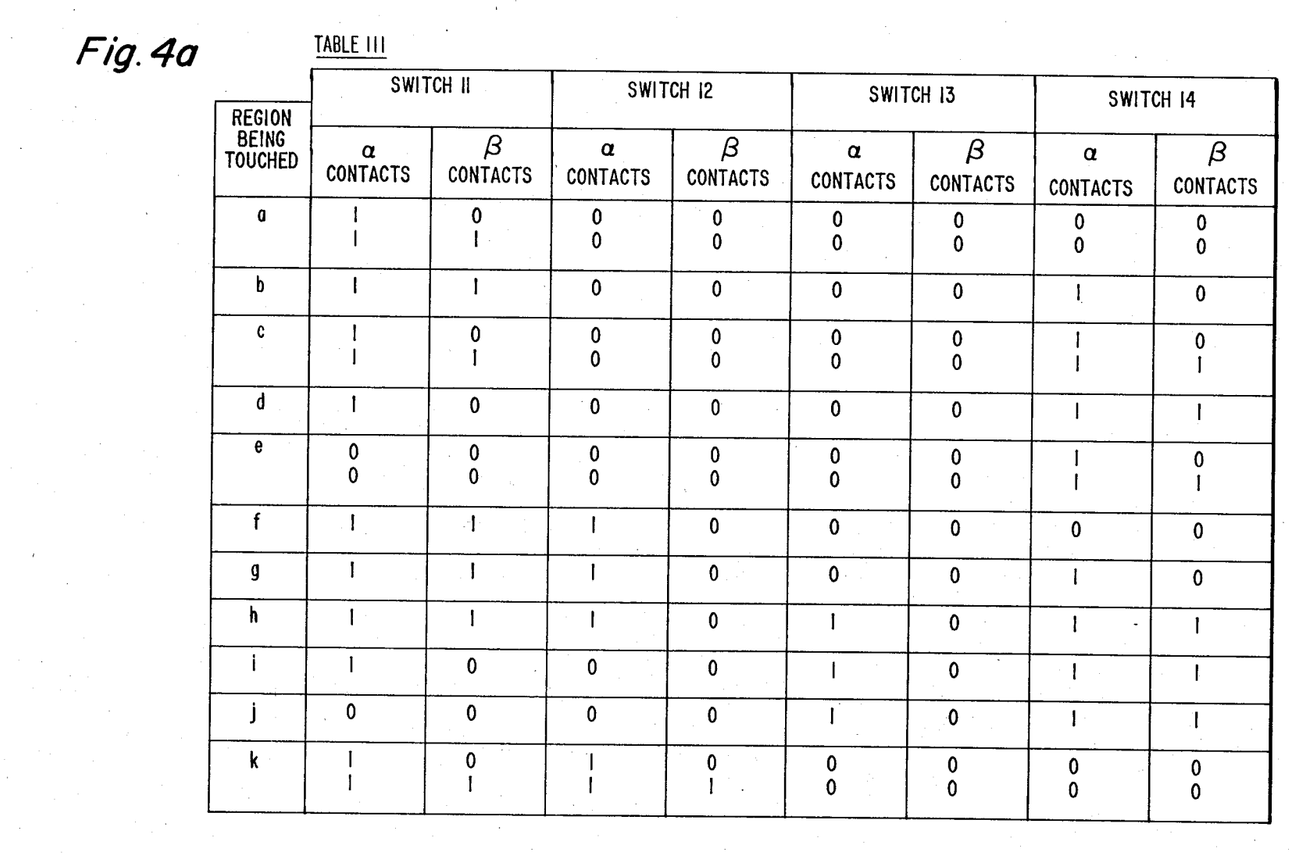
FIGS. 4a, 4b and 4c are a table descriptive of the operation of a decoder used with the FIG. 1 touchplate assembly.
Figure 4B:
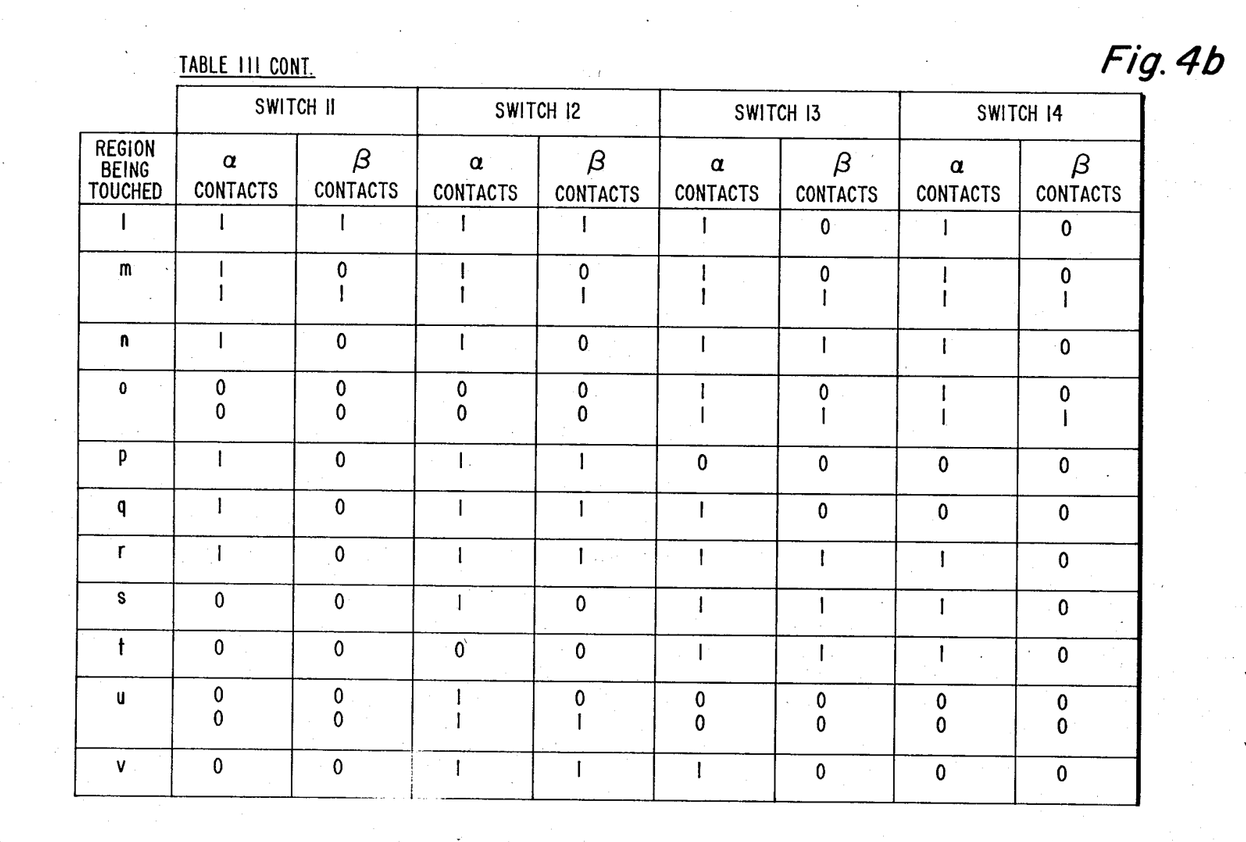
Figure 4C:
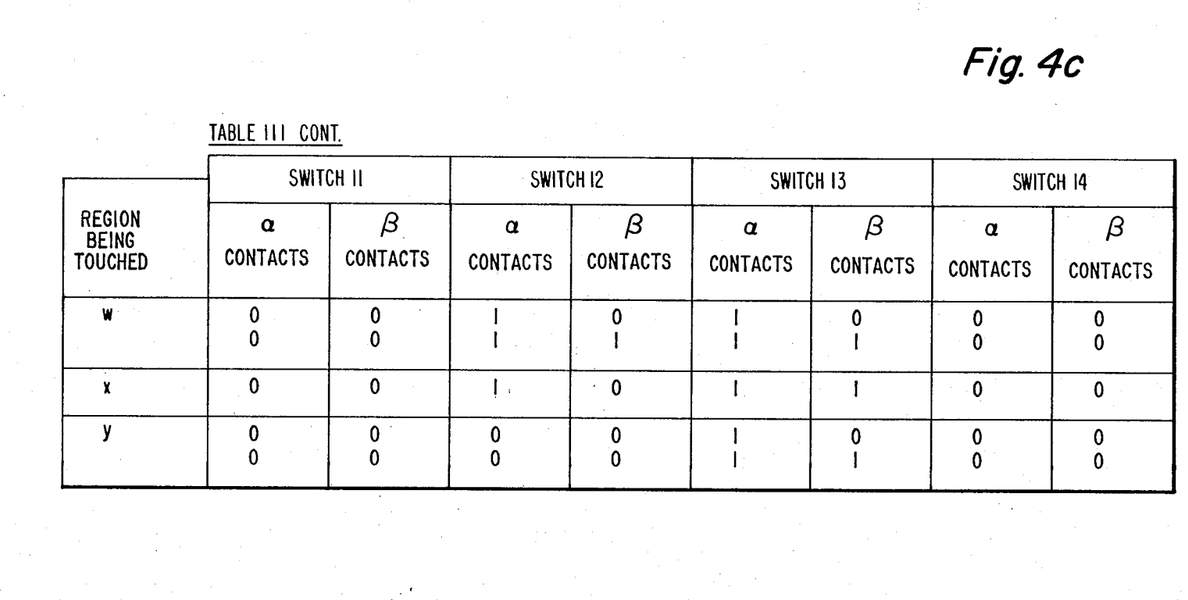

Using Table II to determine row and column coordinates of force applied to the two-dimensional rectangular array of touchpoints on touchplate 10 of FIG. 1, one can construct the truth table TABLE III beginning in FIG. 4a and continued in FIGS. 4b and 4c. In resolving user force applied to any of the touchpoint regions a, b, c, d, e, u, v, w, x, y the one of the rows a, b, c, d, e and u, v, w, x, y containing the touchpoint can be considered as a touchbar to which force is applied, while the other row is considered to be a touchbar to which no force is applied. Similarly, in resolving user force applied to any of the touchpoint regions a, e, g, j, k, o, p, t, u, y columns a, f, h, p, u and c, j, o, t, y can be considered as a pair of touchbars only one of which receives actuating force.

User-applied force to row k, l, m, n, o will be resolved equally between the pair of switches 11, 14 and the pair of switches 12, 13; and user-applied force to column c, h, m, v, w will be resolved equally between the pair of switches 11, 12 and the pair of switches 14, 13. This observation permits a reduction to the touchbar problem. The switch closure patterns associated with pressure applied to touchpoint regions g, i, q, and s become apparent by analogy to the switch patterns associated with touchpoint regions 42 and 44 of FIG. 2.

Working from Table III one can derive the logic equations to which eight-input decoder 30 may adhere if one of twenty-five outputs identified by letters a to y is to be high, or true, for a corresponding identified touchpoint region on touchplate 10 selectively receiving user applied pressure. These equations follow, with $\alpha_{11}$ and $\beta_{11}$ the variables expressing the conditions of the $\alpha$ and $\beta$ contacts of switch 11, $\alpha_{12}$ and $\beta_{12}$ the variables expressing the conditions of the $\alpha$ and $\beta$ contacts of switch 12, $\alpha_{13}$ and $\beta_{13}$ the variables expressing the conditions of the $\alpha$ and $\beta$ contacts of switch 13, and $\alpha_{14}$ and $\beta_{14}$ the variables expressing the conditons of the $\alpha$ and $\beta$ contacts of switch 14.

$a = (\alpha_{11} \cdot \overline{\beta}_{11} \cdot \overline{\alpha}_{12} \cdot \overline{\beta}_{12} \cdot \overline{\alpha}_{13} \cdot \overline{\beta}_{13} \cdot \overline{\alpha}_{14} \cdot \overline{\beta}_{14}) +$ $(\alpha_{11} \cdot \beta_{11} \cdot \overline{\alpha}_{12} \cdot \overline{\beta}_{12} \cdot \overline{\alpha}_{13} \cdot \overline{\beta}_{13} \cdot \overline{\alpha}_{14} \cdot \overline{\beta}_{14})$ $= (\alpha_{11} \cdot \overline{\alpha}_{12} \cdot \overline{\beta}_{12} \cdot \overline{\alpha}_{13} \cdot \overline{\beta}_{13} \cdot \overline{\alpha}_{14} \cdot \overline{\beta}_{14})$ $b = \alpha_{11} \cdot \beta_{11} \cdot \overline{\alpha}_{12} \cdot \overline{\beta}_{12} \cdot \overline{\alpha}_{13} \cdot \overline{\beta}_{13} \cdot \alpha_{14} \cdot \overline{\beta}_{14}$ $c = (\alpha_{11} \cdot \overline{\beta}_{11} \cdot \overline{\alpha}_{12} \cdot \overline{\beta}_{12} \cdot \overline{\alpha}_{13} \cdot \overline{\beta}_{13} \cdot \alpha_{14} \cdot \overline{\beta}_{14}) +$ $(\alpha_{11} \cdot \beta_{11} \cdot \overline{\alpha}_{12} \cdot \overline{\beta}_{12} \cdot \overline{\alpha}_{13} \cdot \overline{\beta}_{13} \cdot \alpha_{14} \cdot \beta_{14})$ $= \alpha_{11} \cdot \overline{\alpha}_{12} \cdot \overline{\beta}_{12} \cdot \overline{\alpha}_{13} \cdot \overline{\beta}_{13} \cdot \alpha_{14} \overline{b} \cdot \overline{d}$ $d = \alpha_{11} \cdot \overline{\beta}_{11} \cdot \overline{\alpha}_{12} \cdot \overline{\beta}_{12} \cdot \overline{\alpha}_{13} \cdot \overline{\beta}_{13} \cdot \alpha_{14} \cdot \beta_{14}$ $e = (\overline{\alpha}_{11} \cdot \overline{\beta}_{11} \cdot \overline{\alpha}_{12} \cdot \overline{\beta}_{12} \cdot \overline{\alpha}_{13} \cdot \overline{\beta}_{13} \cdot \alpha_{14} \cdot \overline{\beta}_{14}) +$ $\overline{\alpha}_{11} \cdot \overline{\beta}_{11} \cdot \overline{\alpha}_{12} \cdot \overline{\beta}_{12} \cdot \overline{\alpha}_{13} \cdot \overline{\beta}_{13} \cdot \alpha_{14} \cdot \beta_{14}$ $= \overline{\alpha}_{11} \cdot \overline{\beta}_{11} \cdot \overline{\alpha}_{12} \cdot \overline{\beta}_{12} \cdot \overline{\alpha}_{13} \cdot \overline{\beta}_{13} \cdot \alpha_{14}$ $f = \alpha_{11} \cdot \beta_{11} \cdot \alpha_{12} \cdot \overline{\beta}_{12} \cdot \overline{\alpha}_{13} \cdot \overline{\beta}_{13} \cdot \overline{\alpha}_{14} \cdot \overline{\beta}_{14}$ $g = \alpha_{11} \cdot \beta_{11} \cdot \alpha_{12} \cdot \overline{\beta}_{12} \cdot \overline{\alpha}_{13} \cdot \overline{\beta}_{13} \cdot \alpha_{14} \cdot \overline{\beta}_{14}$ $h = \alpha_{11} \cdot \beta_{11} \cdot \alpha_{12} \cdot \overline{\beta}_{12} \cdot \overline{\alpha}_{13} \cdot \overline{\beta}_{13} \cdot \alpha_{14} \cdot \beta_{14}$ $i = (\alpha_{11} \cdot \overline{\beta}_{11} \cdot \overline{\alpha}_{12} \cdot \overline{\beta}_{12} \cdot \overline{\alpha}_{13} \cdot \overline{\beta}_{13} \cdot \alpha_{14} \cdot \beta_{14}$ $j = (\overline{\alpha}_{11} \cdot \overline{\beta}_{11} \cdot \overline{\alpha}_{12} \cdot \overline{\beta}_{12} \cdot \alpha_{13} \cdot \overline{\beta}_{13} \cdot \alpha_{14} \cdot \beta_{14}$ $k = (\alpha_{11} \cdot \overline{\beta}_{11} \cdot \alpha_{12} \cdot \overline{\beta}_{12} \cdot \overline{\alpha}_{13} \cdot \overline{\beta}_{13} \cdot \overline{\alpha}_{14} \cdot \overline{\alpha}_{14}) +$ $(\alpha_{11} \cdot \beta_{11} \cdot \alpha_{12} \cdot \beta_{12} \cdot \overline{\alpha}_{13} \cdot \overline{\beta}_{13} \cdot \overline{\alpha}_{14} \cdot \overline{\beta}_{14})$ $= \alpha_{11} \cdot \alpha_{12} \cdot \overline{\alpha}_{13} \cdot \overline{\beta}_{13} \cdot \overline{\alpha}_{14} \cdot \overline{\beta}_{14} \cdot \overline{f} \cdot \overline{p}$ $l = \alpha_{11} \cdot \beta_{11} \cdot \alpha_{12} \cdot \beta_{12} \cdot \alpha_{13} \cdot \overline{\beta}_{13} \cdot \alpha_{14} \cdot \overline{\beta}_{14}$ $m = (\alpha_{11} \cdot \overline{\beta}_{11} \cdot \alpha_{12} \cdot \overline{\beta}_{12} \cdot \alpha_{13} \cdot \overline{\beta}_{13} \cdot \alpha_{14} \cdot \overline{\beta}_{14}) +$ $(\alpha_{11} \cdot \beta_{11} \cdot \alpha_{12} \cdot \beta_{12} \cdot \alpha_{13} \cdot \beta_{13} \cdot \alpha_{14} \cdot \beta_{14})$ $= \alpha_{11} \cdot \alpha_{12} \cdot \alpha_{13} \cdot \alpha_{14} \cdot \overline{h} \cdot \overline{l} \cdot \overline{n} \cdot \overline{r}$ $n = \alpha_{11} \cdot \overline{\beta}_{11} \cdot \alpha_{12} \cdot \overline{\beta}_{12} \cdot \alpha_{13} \cdot \overline{\beta}_{13} \cdot \alpha_{14} \cdot \overline{\beta}_{14}$ $o = (\overline{\alpha}_{11} \cdot \overline{\beta}_{11} \cdot \overline{\alpha}_{12} \cdot \overline{\beta}_{12} \cdot \alpha_{13} \cdot \overline{\beta}_{13} \cdot \overline{\alpha}_{14} \cdot \overline{\beta}_{14}) +$ $(\overline{\alpha}_{11} \cdot \overline{\beta}_{11} \cdot \overline{\alpha}_{12} \cdot \overline{\beta}_{12} \cdot \alpha_{13} \cdot \beta_{13} \cdot \alpha_{14} \cdot \beta_{14})$ -continued $= \overline{\alpha}_{11} \cdot \overline{\beta}_{11} \cdot \overline{\alpha}_{12} \cdot \overline{\beta}_{12} \cdot \alpha_{13} \cdot \alpha_{14} \cdot \overline{j} \cdot \overline{i}$ $p = \alpha_{11} \cdot \overline{\beta}_{11} \cdot \alpha_{12} \cdot \overline{\beta}_{12} \cdot \overline{\alpha}_{13} \cdot \overline{\beta}_{13} \cdot \overline{\alpha}_{14} \cdot \overline{\beta}_{14}$ $q = \alpha_{11} \cdot \overline{\beta}_{11} \cdot \alpha_{12} \cdot \overline{\beta}_{12} \cdot \alpha_{13} \cdot \overline{\beta}_{13} \cdot \overline{\alpha}_{14} \cdot \overline{\beta}_{14}$ $r = \alpha_{11} \cdot \overline{\beta}_{11} \cdot \alpha_{12} \cdot \overline{\beta}_{12} \cdot \alpha_{13} \cdot \overline{\beta}_{13} \cdot \alpha_{14} \cdot \overline{\beta}_{14}$ $s = \overline{\alpha}_{11} \cdot \overline{\beta}_{11} \cdot \alpha_{12} \cdot \overline{\beta}_{12} \cdot \alpha_{13} \cdot \overline{\beta}_{13} \cdot \overline{\alpha}_{14} \cdot \overline{\beta}_{14}$ $t = \overline{\alpha}_{11} \cdot \overline{\beta}_{11} \cdot \overline{\alpha}_{12} \cdot \overline{\beta}_{12} \cdot \alpha_{13} \cdot \overline{\beta}_{13} \cdot \alpha_{14} \cdot \overline{\beta}_{14}$ $u = (\overline{\alpha}_{11} \cdot \overline{\beta}_{11} \cdot \alpha_{12} \cdot \overline{\beta}_{12} \cdot \overline{\alpha}_{13} \cdot \overline{\beta}_{13} \cdot \overline{\alpha}_{14} \cdot \overline{\beta}_{14}) +$ $(\overline{\alpha}_{11} \cdot \beta_{11} \cdot \alpha_{12} \cdot \beta_{12} \cdot \overline{\alpha}_{13} \cdot \overline{\beta}_{13} \cdot \overline{\alpha}_{14} \cdot \overline{\beta}_{14})$ $= \overline{\alpha}_{11} \cdot \overline{\beta}_{11} \cdot \alpha_{12} \cdot \overline{\alpha}_{13} \cdot \overline{\beta}_{13} \cdot \overline{\alpha}_{14} \cdot \overline{\beta}_{14}$ $v = \overline{\alpha}_{11} \cdot \overline{\beta}_{11} \cdot \alpha_{12} \cdot \overline{\beta}_{12} \cdot \alpha_{13} \cdot \overline{\beta}_{13} \cdot \overline{\alpha}_{14} \cdot \overline{\beta}_{14}$ $w = (\overline{\alpha}_{11} \cdot \overline{\beta}_{11} \cdot \alpha_{12} \cdot \overline{\beta}_{12} \cdot \alpha_{13} \cdot \overline{\beta}_{13} \cdot \overline{\alpha}_{14} \cdot \overline{\beta}_{14}) +$ $(\overline{\alpha}_{11} \cdot \overline{\beta}_{11} \cdot \alpha_{12} \cdot \beta_{12} \cdot \alpha_{13} \cdot \beta_{13} \cdot \overline{\alpha}_{14} \cdot \overline{\beta}_{14})$ $= \overline{\alpha}_{11} \cdot \overline{\beta}_{11} \cdot \alpha_{12} \cdot \alpha_{13} \cdot \overline{\alpha}_{14} \cdot \overline{\beta}_{14} \cdot \overline{v} \cdot \overline{x}$ $x = \overline{\alpha}_{11} \cdot \overline{\beta}_{11} \cdot \alpha_{12} \cdot \overline{\beta}_{12} \cdot \alpha_{13} \cdot \beta_{13} \cdot \overline{\alpha}_{14} \cdot \overline{\beta}_{14}$ $y = (\overline{\alpha}_{11} \cdot \overline{\beta}_{11} \cdot \overline{\alpha}_{12} \cdot \overline{\beta}_{12} \cdot \alpha_{13} \cdot \overline{\beta}_{13} \cdot \overline{\alpha}_{14} \cdot \overline{\alpha}_{15}) +$ $(\overline{\alpha}_{11} \cdot \overline{\beta}_{11} \cdot \overline{\alpha}_{12} \cdot \overline{\beta}_{12} \cdot \alpha_{13} \cdot \beta_{13} \cdot \overline{\alpha}_{14} \cdot \overline{\alpha}_{15}$ $= \overline{\alpha}_{11} \cdot \overline{\beta}_{11} \cdot \overline{\alpha}_{12} \cdot \overline{\beta}_{12} \cdot \alpha_{13} \cdot \overline{\alpha}_{14} \cdot \overline{\alpha}_{14}$ The foregoing logic equations, which may be manipulated according to standard reduction techniques, are presented in a form that is suitable for implementation with twenty-five integrated circuit AND/NAND gates with eight-bit-wide inputs. An array of logic inverters or properly wired XOR gates is used to provide complemented input variables to those inputs of the AND/NAND gates requiring them. Alternatively, decoding could be performed by programmable read-only memories, by microprocessor or by a computer with which the touchplate is associated.

The logic equations defining the g, i, q, and s touchpoints can be made somewhat more complex to OR the conditions where the switch in the corner nearest to the touchpoint has its high-force threshold exceeded, the switch in the corner furthest from the switch-point has only its low-force threshold exceeded, and the remaining switches have had similar force threshold conditions exceeded. This allows for larger than normal force on the touchpoint to be properly decoded. Where the touchplate is flexible, rather than rigid, the second conditions listed in Table III for a, e, u, and y touchpoints may be interpreted as response to light pressure on touchpoints g, i, q, and s instead.

Decoder 30 or FIG. 3 decoder decoded output will exhibit several different values when user force is applied to a touchpoint; this is also the case where the decoding function is carried out using a read-only memory, a microprocessor, or a computer. One can simply arrange to accept decoder output after waiting a time after force is applied, as detected by decoder output indicating at least one set of switch contacts being closed. A better way to select the most probably correct decoder output is to continuously sample the decoder output and select the decoder output associated with the most switch contacts being closed. Then, if this selected decoder output is not a valid output, the decoder output next before or next after in time is selected.

Figure 5:
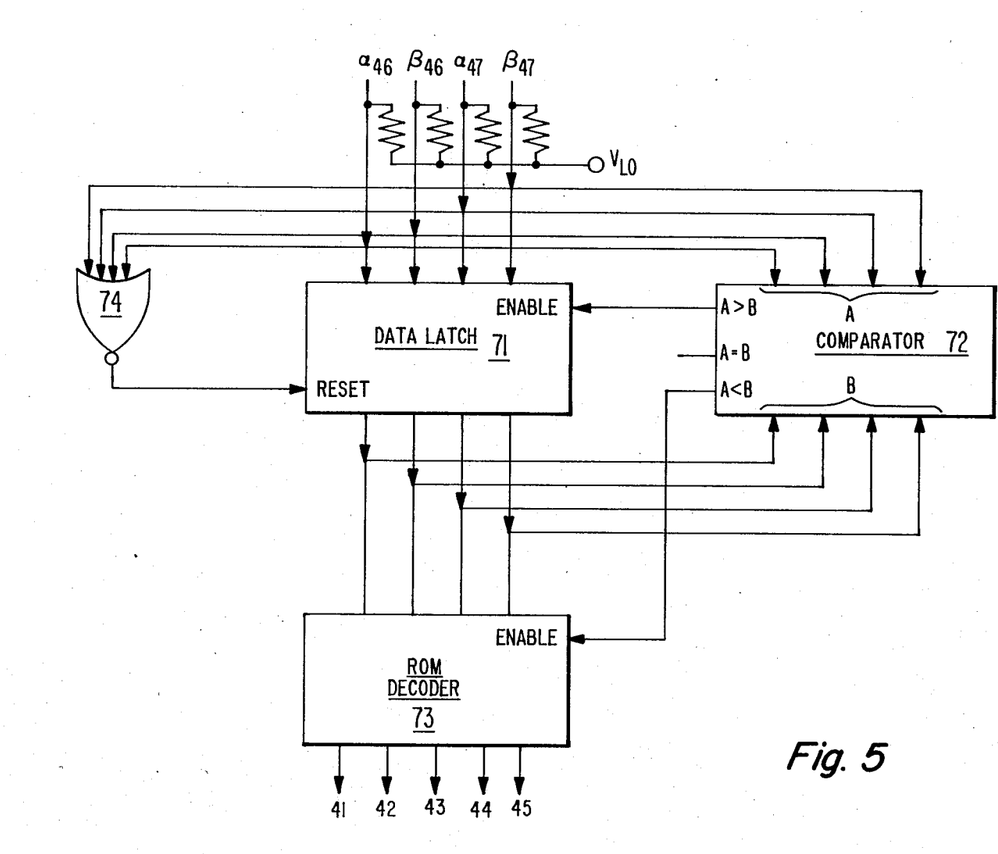
FIG. 5 is a schematic diagram of circuitry for selecting most probably correct decoder output in determining touchpoint location.

FIG. 5 shows hardware for implementing such a decoder output selection scheme, as might be used after the FIGS. 2(a–i) touchbar 40. The extension to hardware for use in connection with the FIG. 1 touchplate assembly and should be apparent to one skilled in the art.

Data latch 71 has been reset to all-ZEROs output at a time prior to the touchbar being touched. Latch 71 receives as input the $\alpha_{46}$, $\beta_{46}$, $\alpha_{47}$, and $\beta_{47}$ logic variables from switches 46 and 47 under touch bar 40 (in FIG. 2). A comparator 72 compares the binary number defined the variables $\alpha_{46}$, $\beta_{46}$, $\alpha_{47}$ and $\beta_{47}$ supplied as A-input to the binary number stored in latch 71 supplied as B-input. Greater force on the touchbar is always associated with each of the $\alpha_{46}$, $\beta_{46}$, $\alpha_{47}$, and $\beta_{47}$ either increasing or remaining the same, never with its decrease, and there are no carriers in the binary number system used. So comparing the binary numbers compares the number of ONEs in them. When A-input exceeds B-input, comparator 72 supplies an enabling signal to latch 71 to latch in these higher $\alpha_{46}$, $\beta_{46}$, $\alpha_{47}$, and $\beta_{47}$ variables.

When comparator 72 B-input exceeds A-input, the number stored in latch 71 describes the greatest force on the touchbar, so the A<B output is a validation signal indicating that decoding should proceed from the number stored in latch 71.

A read-only memory (ROM) with input from latch 71 output is convenient to use as the decoder 73, with the validation signal being applied to enable its reading.

When the force on the touchbar is discontinued, NOR gate 74 responds to $\alpha_{46}$, $\beta_{46}$, $\alpha_{47}$, and $\beta_{47}$ all being ZERO to supply a ONE to reset latch 71 to all-ZEROs output.

The functions provided by the type of hardware just described can be realized in the software of a microprocessor. Where this is done accomodation can be made in the decoding decisions for the force a particular generator tends to exert, as determined from his validating a series of touchpoint selectors. Correlations of switch conditions as applied force changes can also be made to improve the accuracy of decoding decisions.

While in the described embodiments of the invention the decoding logic is such as to respond to switch closure patterns developed in response to both smaller and larger user-applied force on certain touchpoint regions, it is possible to use logic that responds to only one of these force conditions (e.g., the larger). While normally-open double-closure force-sensitive switches have been used between supporting surfaces and touchbars or touchplates pressed towards those supporting surfaces in the illustrated embodiments of the invention, embodiments of the invention may instead use normally-closed double-closure force-sensitive switches between supporting surfaces and touchbars or touchbars pressed away from those surfaces by touch applied through holes in those surfaces. Double-throw rather than single-throw switches may be used to eliminate the need for pull-up or pull-down resistors being used to establish alternative logic conditions when the switches are not user-actuated. This is to be borne in mind when construing the following claims, so such embodiments will fall within their scope.

The present invention may also be used in applications where the touchbar or touchplate is non-transparent. A number of different types of decoders may be used in various embodiments of the invention. Decoder 50 may be replaced with a decoder supplying a three-bit binary number specifying which touchpoint on touchbar 40 pressure is applied to. Decoder 30 may be replaced with a decoder supplying a five-bit binary number specifying which touchpoint on touchplate 10 pressure is applied to.

What is claimed is:

1. Touch responsive apparatus comprising:
   a structural member being disposed to receive touches made directly on a surface thereof and having on its said surface a number of valid touchpoint areas;
   a support structure which is relatively immobile when said structural member receives a touch on its said surface;
   a plurality of force-sensitive switches at least one of which is of plural-contact plural-closure type connected to respond to forces between said support structure and points on said structural member which points are fewer in number than said valid touchpoint areas, each said plural-closure switch having different patterns of closure of its contacts for a first condition in which it receives no force responsive to a touch on said structural member surface, for a second condition in which it receives a relatively small force responsive to a touch on said structural member surface, and for a third condition in which it receives a relatively large force responsive to a touch on said structural member surface; and
   a decoder responsive to the patterns of closure of said switches for providing indications of to which of said touchpoint areas an actuating force has been applied.

2. In combination:
   a touchbar with first and second ends;
   a supporting surface;
   first and second similar switch means arranged to respond to force between respectively the first and second ends of said touchbar and said supporting surface, each of said first and second switch means having a respective first set of contacts changing from a normal condition of conduction or non-conduction to the alternative condition at a relatively small threshold force, and each having a respective second set of contacts changing from a normal condition of conduction or non-conduction to the alternative condition at a relatively large threshold force;
   means responding to said normal and alternative conditions of the first set of contacts of said first switch means for generating first and second logic conditions, respectively, on a first bus;
   means responding to said normal and alternative conditions of the first set of contacts of said second switch means for generating first and second logic conditions, respectively, on a second bus;

means responding to said normal and alternative conditions of the second set of contacts of said first switch means for generating first and second logic conditions, respectively, on a third bus;

means responding to said normal and alternative conditions of the second set of contacts of said second switch means for generating first and second logic conditions, respectively, on a fourth bus; and a decoder having four input connections, a respective one to each of said first and second and third and fourth busses, and having output connections for supplying indications of said touchbar or its like being touched at its first end, between its first end and its middle, at its middle, between its middle and its second end, and at its second end, respectively.

3. A combination as set forth in claim 2 wherein said touchbar is transparent along its length and is disposed parallel to the screen of a viewing device.

4. A combination as set forth in claim 2 wherein said decoder includes:

means for providing indications of said touchbar being touched at just its first end, responsive to second logic condition on said first bus and first logic condition on said second and fourth busses.

5. A combination as set forth in claim 2 wherein said decoder includes:

means for providing indications of said touchbar being touched between its first end and its middle, which indications are provided responsive to first logic condition on said fourth bus and second logic condition on said first, second and third busses.

6. A combination as set forth in claim 2 wherein said decoder also includes:

means for providing indications of said touchbar being touched at its first end, responsive to second logic condition on said first bus and to first logic condition on said second and fourth busses;

means for providing indications of said touchbar being touched at its second end, responsive to first logic condition on said first and third busses and to second logic condition on said second bus;

means for providing indications of said touchbar being touched between its first end and its middle, responsive to first logic condition on said fourth bus and second logic condition on said first, second and third busses; and means for providing indications of said touchbar being touched between its second end and its middle responsive to first logic condition on said third bus and to second logic condition on said first, second and fourth busses.

7. A combination as set forth in claim 2 or 6 wherein said decoder includes:

means for providing indications of said touchbar being touched at its middle, which indications are provided responsive to second logic condition on said first, second, third and fourth busses.

8. A combination as set forth in claims 2 or 6 wherein said decoder includes:

means for providing indications of said touchbar being touched at its middle, which indications are provided responsive to second logic condition on said first and second busses and first logic condition on said third and fourth busses.

9. In combination: a touchplate with first, second, third and fourth support points at corners of a rectangle; a supporting surface;

first, second, third and fourth similar switch means arranged to respond to pressure between respectively the first, second, third and fourth support points of said touchplate and said supporting surface, each of said switch means having a respective first set of contacts changing from a normal condition of conduction or non-conduction to the alternative condition at a relatively small threshold force, and each of said switch means having a respective second set of contacts changing from a normal condition of conduction or non-conduction to the alternative condition at a relatively large threshold force;

means responding to said normal and alternative conditions of the first set of contacts of said first switch means for generating first and second logic conditions, respectively, on a first bus;

means responding to said normal and alternative conditions of the first set of contacts of said second switch means for generating first and second logic conditions, respectively, on a second bus;

means responding to said normal and alternative conditions of the first set of contacts of said third switch means for generating first and second logic conditions, respectively, on a third bus;

means responding to said normal and alternative conditions of the first set of contacts of said fourth switch means for generating first and second logic conditions, respectively, on a fourth bus;

means responding to said normal and alternative conditions of said second set of contacts of said first switch means for generating first and second logic conditions, respectively, on a fifth bus;

means responding to said normal and alternative conditions of said second set of contacts of said second switch means for generating first and second logic conditions, respectively, on a sixth bus;

means responding to said normal and alternative conditions of said second set of contacts of said third switch means for generating first and second logic conditions, respectively, on a seventh bus;

means responding to said normal and alternative conditions of said second set of contacts of said fourth switch means for generating first and second logic conditions, respectively, on an eighth bus;

a decoder having eight input connections, each to a respective one of said first, second, third, fourth, fifth, sixth, seventh, and eighth busses and having output connections for supplying indications of which, if any, of a plurality of touchpoint regions is touched, these touchpoint regions being arranged in five rows between the side of the rectangle bounded by the first and fourth touchplate support points and the side of the rectangle bounded by the second and third touchplate support points, these touchpoint regions being further arranged in five columns between the side of the rectangle bounded by the first and second touchplate support points and the side of the rectangle bounded by the fourth and third touchplate support points.

10. A combination as set forth in claim 9 wherein said touchplate is transparent at least in an area bounded by said rectangle and disposed over the screen of a viewing device.

11. A combination as set forth in claim 9 wherein said decoder is of a type that produces an output indication of said touchpoint region in the first row and first column being touched, said indication being produced responsive to second logic condition on said first bus and first logic condition on said second, third, fourth, sixth, seventh and eighth busses.

12. A combination as set forth in claim 9 wherein said decoder is of a type that produces an output indication of said touchpoint region in the first row and second column being touched, said indication being produced responsive to second logic condition on said first and fourth and fifth busses and to first logic condition on said second, third, sixth, seventh and eighth busses.

13. A combination as set forth in claim 9 wherein said decoder is of a type that produces an output indication of said touchpoint region in the first row and third column being touched, said indication being produced responsive to second logic condition on said first, fifth, fourth and eighth busses and to first logic condition on said second, third, sixth and seventh busses.

14. A combination as set forth in claim 9 wherein said decoder is of a type that produces an output indication of said touchpoint region in the first row and third column being touched, said indication being produced responsive to second logic condition on said first and fourth busses and to first logic condition on said second, third, fifth, sixth, seventh and eighth busses.

15. A combination as set forth in claim 9 wherein said decoder is of a type that produces an output indication of said touchpoint region in the second row and second column being touched, said indication being produced responsive to second logic condition on said first, second, fourth and fifth busses and first logic condition on said third, sixth, seventh and eighth busses.

16. A combination as set forth in claim 9 wherein said decoder is of a type that produces an output indication of said touchpoint region in the second row and third column being touched, said indication being produced responsive to second logic condition on first, second, third, fourth, fifth and eighth busses and first logic condition on said sixth and seventh busses.

17. A combination as set forth in claims 9, 11, 12, 13, 15 or 16 wherein said decoder is of a type that also produces an output indication of said touchpoint region in the third row and third column being touched, said indication being produced responsive to second logic condition on said first, second, third, fourth, fifth, sixth, seventh and eighth busses.

18. A combination as set forth in claim 17 wherein said decoder is of a type that also produces an output indication of said touchpoint region in the third row and third column being touched, said indication being produced responsive to second logic condition on said first, second, third and fourth busses and first logic condition on said fifth, sixth, seventh and eighth busses or in response to second logic condition on all eight of those busses.

19. A combination as set forth in claim 9 wherein said decoder is of a type that also produces an output indication of said touchpoint region in the third row and third column being touched, said indication being produced responsive to second logic condition on said first, second, third and fourth busses and first logic condition on said fifth, sixth, seventh and eighth busses or in response to second logic condition on all eight of those busses, first, second, third and fourth busses and first logic condition on said fifth, sixth, seventh and eighth busses or in response to second logic condition on all eight of those busses.

20. A combination as set forth in claim 9 wherein said decoder is of a type having twenty-five output connections that operates in accordance with a truth table, as set forth in Table III of FIGS. 4a, 4b and 4c, to provide an indication on each of said twenty-five output connections when a corresponding touchpoint region on said touchplate receives user-applied force.

21. Touch responsive apparatus comprising:
a structural member having on its surface a number of valid touchpoint areas;
a support structure;
a plurality of force-sensitive switches, each having at least one set of contacts, connected to respond to forces between said support structure and points on said structural member, which points are fewer in number than said valid touchpoint areas, this being made possible by at least one of said force-sensitive switches being a plural-contact plural-closure switch, each said plural-closure switch having different closure patterns of its contacts for a first condition in which it receives no force responsive to a touch on said structural member surface, for a second condition in which it receives a relatively small force responsive to a touch on said structural member surface, and for a third condition in which it receives a relatively large force responsive to a touch on said structural member surface;
means for generating binary logic levels descriptive of the conditions of said sets of contacts;
means for storing at least one of the successive sets of logic levels descriptive of the conditions of said sets of contacts at a particular time;
means for comparing the most recently stored set of logic levels with the set of logic levels at the time of comparison for providing indications of the relative sizes of the forces generating these two successive sets of logic levels; and
means, responsive to an indication by said means for comparing that the force required to generate the set of logic levels at time of comparison is less than that required to generate the most recently stored set of binary logic levels, for decoding the most recently stored set of logic levels to provide an indication of which one of said valid touchpoint areas, if any, has substantial force applied thereto.

* * * * *